US011168730B2

(12) United States Patent
Paul (10) Patent No.: US 11,168,730 B2
(45) Date of Patent: Nov. 9, 2021

(54) APPARATUS FOR TIGHTENING THREADED FASTENERS

(71) Applicant: HYTORC Division UNEX Corporation, Mahwah, NJ (US)

(72) Inventor: Joseph Paul, Oak Ridge, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 274 days.

(21) Appl. No.: 15/765,886

(22) PCT Filed: Oct. 5, 2016

(86) PCT No.: PCT/US2016/055603
§ 371 (c)(1),
(2) Date: Apr. 4, 2018

(87) PCT Pub. No.: WO2017/062527
PCT Pub. Date: Apr. 13, 2017

(65) Prior Publication Data
US 2018/0298937 A1    Oct. 18, 2018

Related U.S. Application Data

(60) Provisional application No. 62/237,051, filed on Oct. 5, 2015.

(51) Int. Cl.
*F16B 39/06* (2006.01)
*B25B 21/00* (2006.01)

(52) U.S. Cl.
CPC ............ *F16B 39/06* (2013.01); *B25B 21/005* (2013.01)

(58) Field of Classification Search
CPC ........ F16B 5/02; F16B 5/0208; F16B 5/0233; F16B 5/0266; F16B 21/04; F16B 23/0007;
(Continued)

(56) References Cited

U.S. PATENT DOCUMENTS 599,837 A  *  3/1898  Harris ..................... B25B 13/32
                                                          81/90.3
1,254,514 A  *  1/1918  Lehmann ................ F16B 37/14
                                                          411/429
(Continued)

*Primary Examiner* — Roberta S Delisle
(74) *Attorney, Agent, or Firm* — Justin B. Bender, Esq.

(57) ABSTRACT

Apparatus for use in operations of tightening and/or loosening threaded fasteners of the kind having a nut and stud about an axis are disclosed and include: a threaded assembly threadedly engageable with exposed threads of the stud above the nut and either a nut, a tool socket and/or a tool housing engagement assembly. Torque tools of the kind having a pass-through socket including the apparatus are disclosed. And systems including the torque tools of the kind having a pass-through socket including the apparatus and threaded fasteners are disclosed. Advantageously holding plate assemblies of the present invention: allow torque tools and/or drive extension links with through sockets to be used in vertical, inverted and/or tight clearance bolting applications; allow for simultaneous operation of multiple such tools on such bolting applications to achieve Parallel Joint Closure™; account for bolting application having long and/or protruding studs; and increase bolting speed and safety, efficiency, reliability and repeatability.

14 Claims, 4 Drawing Sheets

(58) Field of Classification Search
CPC .............. F16B 23/0061; F16B 23/0069; F16B 23/0076; F16B 31/02; F16B 31/04; F16B 31/043; F16B 37/14; F16B 39/06; F16B 41/002; F16B 41/005; F22B 7/16; B25B 21/005; B25B 29/02; B25B 21/004; B25B 13/46; Y10S 41/91; Y10S 41/999; F15B 15/061
USPC ......... 411/14.5, 337, 372.5–372.6, 373–374, 411/549; 81/57.14, 57.39
See application file for complete search history.

(56) References Cited

U.S. PATENT DOCUMENTS

| | | | | |
|---|---|---|---|---|
| 1,670,214 | A * | 5/1928 | Roche | B25B 23/00 81/58.4 |
| 2,324,187 | A * | 7/1943 | Arthur | B25B 13/46 81/90.1 |
| 2,382,074 | A * | 8/1945 | Leisenring | B25B 13/481 81/179 |
| 2,475,446 | A * | 7/1949 | Cohen | A45B 25/18 135/33.6 |
| 2,653,835 | A * | 9/1953 | Nelson | E03D 11/16 411/222 |
| 2,800,045 | A * | 7/1957 | Mann | B25B 13/46 81/90.3 |
| 3,015,245 | A * | 1/1962 | Dracka | B25B 13/46 81/126 |
| 4,557,654 | A * | 12/1985 | Masuda | F16B 37/14 411/373 |
| 4,582,462 | A * | 4/1986 | Thiel | B60B 3/165 411/372.5 |
| 5,097,730 | A * | 3/1992 | Bernard | B25B 21/005 81/57.39 |
| 5,590,992 | A * | 1/1997 | Russell | B60B 7/14 301/37.374 |
| 5,603,472 | A * | 2/1997 | Hutter, III | F16B 37/14 244/132 |
| 6,810,571 | B1 * | 11/2004 | Junkers | B25B 13/488 29/452 |
| 6,880,433 | B1 * | 4/2005 | Tanimura | F16B 31/04 411/119 |
| 8,608,421 | B1 * | 12/2013 | Halsey | F16B 31/04 411/204 |
| 10,487,866 | B2 * | 11/2019 | Wu | F16B 19/109 |
| 2006/0101951 | A1 * | 5/2006 | Junkers | B25B 21/002 81/57.14 |
| 2008/0289465 | A1 * | 11/2008 | Bruurs | B23D 31/008 83/13 |
| 2009/0263208 | A1 * | 10/2009 | Erskine | F16B 5/0692 411/337 |
| 2011/0314972 | A1 * | 12/2011 | Rickley, III | B25B 21/005 81/57.39 |
| 2018/0117742 | A1 * | 5/2018 | Chou | B25B 13/465 |

* cited by examiner

APPARATUS FOR TIGHTENING THREADED FASTENERS

CROSS REFERENCE TO RELATED APPLICATIONS

This Application either claims priority to and/or is either a continuation patent application or a continuation-in-part application of the following commonly owned and patent application, an entire copy of which is incorporated herein by reference: U.S. Application Ser. No. 62/237,051, having Filing Date of 5 Oct. 2015, entitled "APPARATUS FOR TIGHTENING THREADED FASTENERS".

BACKGROUND OF INVENTION

Threaded fasteners including bolts, studs, nuts and washers are known and used in traditional bolting applications. Maintenance and repair of industrial applications begin with loosening of and end with tightening of these threaded fasteners. Naturally industry seeks to reduce production loss during routine, unforeseen and/or emergency maintenance and/or repair.

Vertical and/or inverted bolting applications, including those with tight clearances, pose significant challenges. Industry's use of low clearance torque tools and off-set links for use with regular clearance square drive torque tools may be sufficient to tighten and/or loosen a threaded fastener but sacrifice operator safety and increase maintenance and repair time.

What is needed is simplification in tool and driver design and operation, increased bolting speed and safety, efficiency, reliability and repeatability, improve access of the tool to nuts and increase the tool's usefulness in the field, all at low cost. The present invention has therefore been devised to solve these issues.

SUMMARY OF INVENTION

Apparatus for use in operations of tightening and/or loosening threaded fasteners of the kind having a nut and stud about an axis are disclosed and include: a threaded assembly threadedly engageable with exposed threads of the stud above the nut and either a nut, a tool socket and/or a tool housing engagement assembly. Torque tools of the kind having a pass-through socket including the apparatus are disclosed. And systems including the torque tools of the kind having a pass-through socket including the apparatus and threaded fasteners are disclosed. Advantageously holding plate assemblies of the present invention: allow torque tools and/or drive extension links with through sockets to be used in vertical, inverted and/or tight clearance bolting applications; allow for simultaneous operation of multiple such tools on such bolting applications to achieve Parallel Joint Closure™; account for bolting application having long and/or protruding studs; and increase bolting speed and safety, efficiency, reliability and repeatability.

BRIEF DESCRIPTION OF THE DRAWINGS

The invention(s) of the present application may be described, by way of example only, with reference to the accompanying drawings, of which.

SPECIFICATION

Apparatus for use in operations of tightening and/or loosening threaded fasteners of the kind having a nut and stud about an axis are disclosed and include: a threaded assembly threadedly engageable with exposed threads of the stud above the nut and either a nut, a tool socket and/or a tool housing engagement assembly. Torque tools of the kind having a pass-through socket including the apparatus are disclosed. And systems including the torque tools of the kind having a pass-through socket including the apparatus and threaded fasteners are disclosed. Advantageously holding plate assemblies of the present invention: allow torque tools and/or drive extension links with through sockets to be used in vertical, inverted and/or tight clearance bolting applications; allow for simultaneous operation of multiple such tools on such bolting applications to achieve Parallel Joint Closure™; account for bolting application having long and/or protruding studs; and increase bolting speed and safety, efficiency, reliability and repeatability.

Referring to FIGS. 1A, 1B, 1C, 1D and 1E, by way of example, they show a holding plate assembly 100, an exemplary embodiment of the present invention. Holding plate assembly 100, as shown, allows a limited (low) clearance hydraulic torque tool 10 with a pass through socket 16, like the HYTORC® STEALTH®, to be used in vertical, inverted and/or limited clearance bolting applications. Tool 10 has a cylinder-piston means 11 (not shown) and a ratchet link drive means 12. Such tools are well known in the art and are disclosed, for example, in U.S. Pat. Nos. 5,924,340, 6,105,472, 6,260,444, 6,427,559 and 6,925,911, entire copies of which are incorporated herein by reference. A hex socket 16 is formed between first and second link drive housing portions 13A and 13B. Drive plates 14, ratchet 15A and drive pawl 15B (not shown) operatively connect cylinder-piston means 11 and hex socket 16. Pass-through socket, or hex socket, 16 is rotatably coupled to nut 22 and engages an outer nut wall 22D of nut 22 via a socket engagement wall 16A of hex socket 16.

Figures 1A, 1B, 1C:
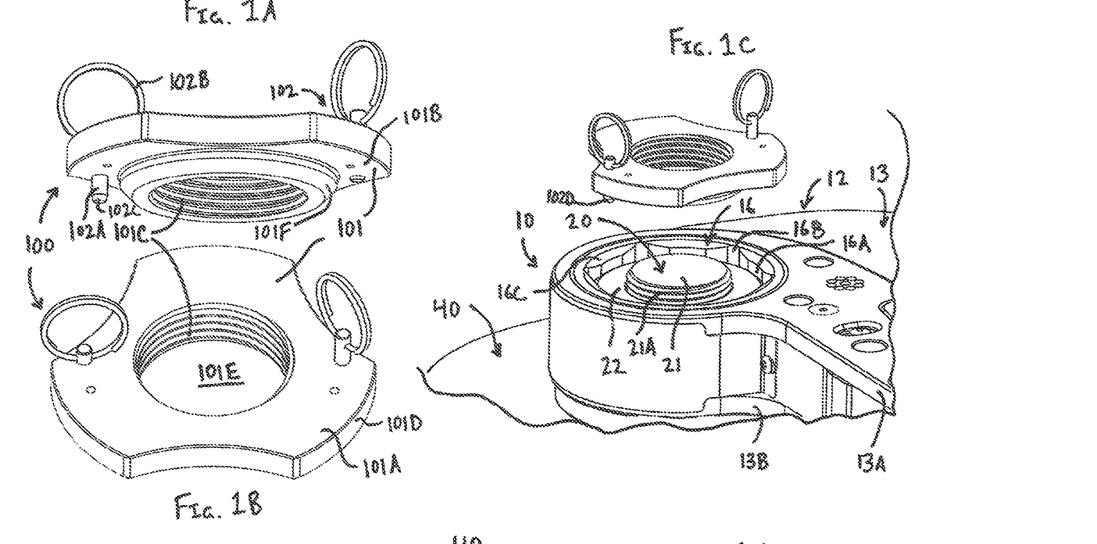
FIGS. 1A, 1B, 1C, 1D and 1E show various views of a first exemplary embodiment of the present invention.
Figure 1D:
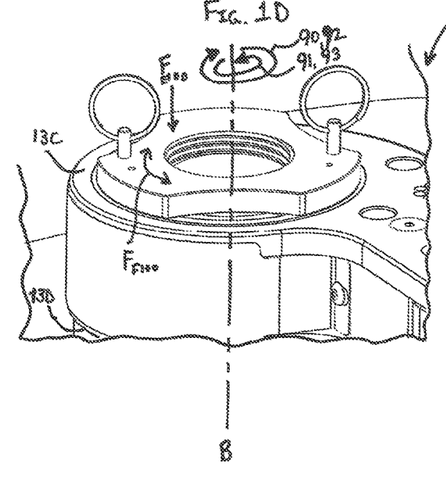
Figure 1E:
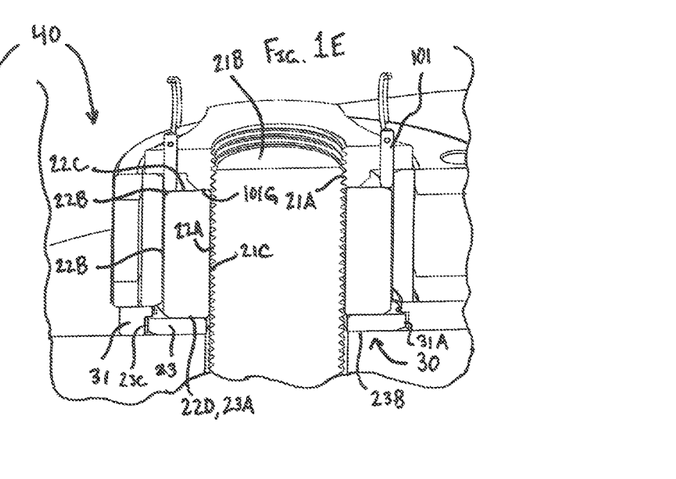

A turning force 90 in one direction 92 tightens and/or loosens a threaded fastener 20. As shown, threaded fastener 20 includes a stud 21, a nut 22 and a washer 23. An equal and opposite reaction force 91 in another direction 93 is generated and transferred to an external abutment (not shown), which could be a nearby nut. Applicant's recently developed HYTORC® Z® system may be used with tool 10. As shown in FIG. 1E, tool 10 includes a HYTORC® Z® reaction plate assembly 30 having a reaction plate 31 rotatably coupled with link drive housing 13. A lower nut face 22D rotates over an upper smooth washer face 23A. Once seated, nut 22 applies a clamping force on HYTORC® Z® Washer 23. A lower friction-enhanced washer face 23B of HYTORC® Z® Washer 23 prevents it from rotating with nut 23. A polygonal outer engagement surface 23C engages with a corresponding polygonal inner engagement surface 31A of reaction plate 31. In this case, reaction force 91 is transferred to HYTORC® Z® Washer 23 via reaction plate 31.

Holding plate assembly 100 utilizes exposed threads 21A of a threaded stud 21 above nut 22 to support limited clearance tool 10 onto bolting application 40. A holding plate 101 has an annular shape similar in diameter as socket 16 and includes: a top face 101A; a bottom face 101B; an inner threaded wall 101C; and an outer wall 101D. Threaded inner wall 101C which surrounds an inner void 101E is threadedly engageable with exposed threads 21A of stud 21. An annular projection 101F extends downwardly from bottom face 101B and has a projection face 101G. An operator hand tightens holding plate assembly 100 around exposed threads 21A such that projection face 101G rests on upper nut face 22C and/or an upper socket face 16C. This generates an engagement force $F_{E100}$ on nut 22. A friction force $F_{F100}$ is also generated between projection face 101G, dowel pin assembly 102 and/or upper nut face 22C.

A retaining dowel pin assembly 102 includes: one or more dowel pins 102A; and one or more installation rings 102B. Dowel pins 102A extend through one or more holes 101H of holding plate 101. End portions 102C of dowel pins 102A fit into corner relief portions 16B of hex socket 16 and rotatably couple holding plate assembly 100 with nut 22. Nut 22, as shown, includes chamfered nut edges 22B which receive and angularly correspond to chamfered pin edges 102D of dowel pin end portions 102C. Once the operator hand tightens holding plate assembly 100 around exposed threads 21A, retaining dowel pin assembly 102 allows holding plate 101 to turn together with and at the same rate as hex socket 16 and thus nut 22. This rotational coupling maintains a substantially consistent engagement force $F_{E100}$ on nut 22 throughout a tightening or loosening process. Absent pins 103A, or a similar coupling/friction feature, holding plate 101 may not rotate with nut 22. Indeed as tool 10 tightens nut 22 a gap may form and widen between projection face 101G of holding plate 101 and upper nut face 22C of nut 22. During loosening, dowel pins 103A help prevent holding plate assembly 100 from locking up against tool 10 and/or nut 22. The operator need only remove dowel pins 103A from contact with nut 22 or socket 16.

Operation of holding plate assembly 100 is as follows. In an optional step, the operator places a HYTORC® Z® Washer 23 on bolting application 40. The operator places nut 22 on threaded stud 21 and hand tightens nut 22 to bolting application 40. Tool 10 engages with nut 22, as shown in FIG. 2. Internal threads 101C of holding plate 101 engage exposed stud threads 21A of stud 21 above upper nut face 22C. Note that end portions 102C of dowel pins 102 do not protrude from bottom face 101B of holding plate 101 at this point. The operator hand tightens holding plate assembly 100 around exposed threads 21A such that projection face 101G rests adjacent upper nut face 22C. The operator pushes pins 102A down to rotatably couple holding plate 101 and hex socket 16 and nut 22, if socket 16 is thicker than nut 22, as shown in FIGS. 1C-1E. Otherwise pins 103A just engage nut 22 if it is thicker than socket 16. These steps are represented by FIG. 1D. Then the operator tightens nut 22. Simply reverse these steps to loosen nut 22.

Tool 10 is securely supported to fastener 20. While tool 10 is tightening or loosening nut 22, holding plate assembly 100 turns with hex socket 16 and nut 22. Holding plate assembly 200 applies the substantially consistent engagement force $F_{E100}$ acting in a parallel direction to turning force axis B and/or the substantially consistent engagement force $F_{F100}$ acting in a normal direction to turning force axis B. Note that holding force $F_{E100}$ is substantially equivalent to the force generated when the operator hand tightens holding plate 101.

Holding plate assembly 100 is separate from and unattachable to tool 10. This may pose unnecessary safety risks during installation and removal of tool 10 from the bolting application. Another exemplary embodiment of the present invention, a holding plate assembly 200, is shown in FIGS. 2A, 2B, 2C and 2D. Holding plate assembly 200, as shown, allows tool 10 to be used in vertical and/or inverted bolting applications. Note that components of tool 10, threaded fastener 20, HYTORC® Z® reaction plate assembly 30, bolting application 40 and turning and reaction forces 90 and 92 of FIGS. 1A-1E correspond to similar structures shown in FIGS. 2A-2D.

Holding plate assembly 200 includes: a threaded plate assembly 201; a retaining dowel pin assembly 202; a retaining knob assembly 203; and a retaining bracket assembly 204. Holding plate assembly 200 utilizes exposed threads 21A of threaded stud 21 above nut 22 to support limited clearance tool 10 onto bolting application 40. Threaded plate assembly 201 has an annular shape similar in diameter as nut 22 and includes: a top face 201A; a bottom face 201B; and inner threaded wall 201C; and an outer wall 201D. Threaded inner wall 201C which surrounds an inner void 201E is threadedly engageable with exposed threads 21A of stud 21. An annular projection 201F extends outwardly from bottom face 201B and a lower portion of outer wall 201D. It has an upper projection face 201G and a lower projection face 201K. Threaded plate assembly 201 further includes one or more biasing springs 201H formed in one or more holes 201I and extending beyond top face 201A. Biasing springs 201H pressurize threaded plate assembly 201 and retaining knob 203 as holding plate 201 threads down stud 21. Threaded plate assembly 201 further includes one or more threaded holes 201J.

Retaining dowel pin assembly 202 includes: one or more dowel pins 202A; and one or more installation rings 202B. Dowel pins 202A extend through one or more holes 203K of retaining knob 203 and one or more holes 201J of threaded plate assembly 201 once assembled. End portions 202C of dowel pins 202A fit into corner relief portions 16B of hex socket 16 and rotatably couple holding plate assembly 200 with nut 22. Nut 22, as shown, includes chamfered nut edges 22B which receive and angularly correspond to chamfered pin edges 202D of dowel pin end portions 202C. One or more ball plungers 202E formed in one or more holes 202F lock dowel pins 202A into such rotational coupling once assembled.

Retaining knob assembly 203 has a hollow annular shape slightly larger than threaded plate assembly 201. Retaining knob assembly 203 includes: a top face 203A; a bottom face 203B; and inner outwardly facing wall 203C; an outer outwardly facing wall 203D; an inner inwardly facing wall 203I; and an outer inwardly facing wall 203J. Inner outwardly facing wall 203C surrounds an inner void 203E. The underside of retaining knob assembly 203 receives and substantially surrounds a majority of threaded plate assembly 201. Retaining knob assembly 203 and threaded plate assembly 201 are connected by one or more cap screws 203F which extend through one or more through holes 203G. Cap screws 203F thread into threaded holes 201J of holding plate 201 once assembled.

Retaining bracket assembly 204 has a ring portion 204D which substantially surrounds outer wall 201D and rests on upper projection face 201G. Ring portion 204D is formed between annular projection 201F of holding plate 201 and the underside of retaining knob assembly 203 once assembled. Retaining bracket assembly 204 is not rotatably coupled with holding plate 201 or retaining knob assembly 203. A tool housing connection portion 204A includes one or more screws 204B formed through one or more holes 204C and into link drive housing portions 13A and 13B. Retaining bracket assembly 204 is attached to and rotatably coupled to link drive housing 13.

Assembly of holding plate assembly 200 is as follows. The operator provides threaded plate assembly 201. The operator places ring portion 204D of retaining bracket assembly 204 over annular projection 201F. Retaining knob assembly 203 is placed over ring portion 204D and substantially surrounds threaded plate assembly 201. Cap screws 203F connect holding plate 201 and retaining knob assembly 203. Dowel pins 202A are inserted. And tool housing connection portion 204A is attached to link drive housing 13. An operator hand tightens holding plate assembly 200 around exposed threads 21A such that projection face 201K rests on upper nut face 22C and/or upper socket face 16C. This generates an engagement force $F_{E200}$ on nut 22. A friction force $F_{F200}$ is also generated between projection face 201K, dowel pin assembly 202 and/or upper nut face 22C.

Once hand tightened, dowel pin assembly 202 and biasing springs 201H allow the combination of threaded plate assembly 201 and retaining knob assembly 203, rotatably coupled via cap screws 203F, to turn together with and at the same rate as hex socket 16 and thus nut 22. Biasing springs 201H minimize a gap which may form between threaded plate assembly 201 and retaining knob assembly 203 as threaded plate assembly 201 threads down stud 21. This rotational coupling maintains substantially consistent engagement force $F_{E200}$ on nut 22 and/or socket 16 throughout a tightening or loosening process. Absent pins 203A, or a similar coupling/friction feature, holding plate 201 may not rotate with nut 22. Indeed as tool 10 tightens nut 22 a gap may form and widen between projection face 201K and upper nut face 22C and/or upper socket face 16C. During loosening, dowel pin assembly 202 and biasing springs 201H help prevent holding plate assembly 200 from locking up against tool 10 and/or nut 22. The operator need only remove dowel pins 203A from contact with nut 22 or socket 16 or untighten cap screws 303F.

Figure 2A:
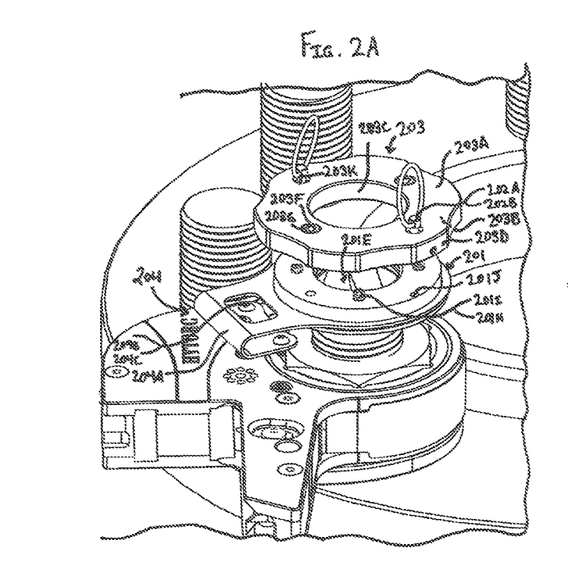
FIGS. 2A, 2B, 2C and 2D show various views of a second exemplary embodiment of the present invention.
Figure 2B:
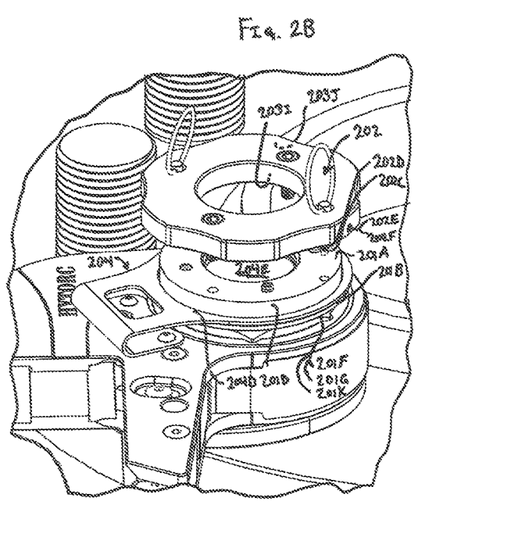
Figure 2C:
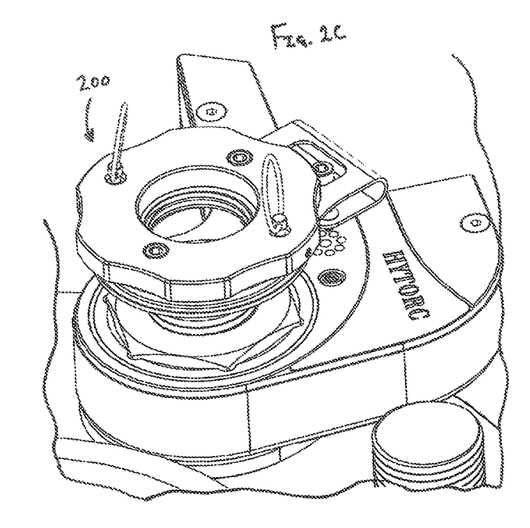
Figure 2D:
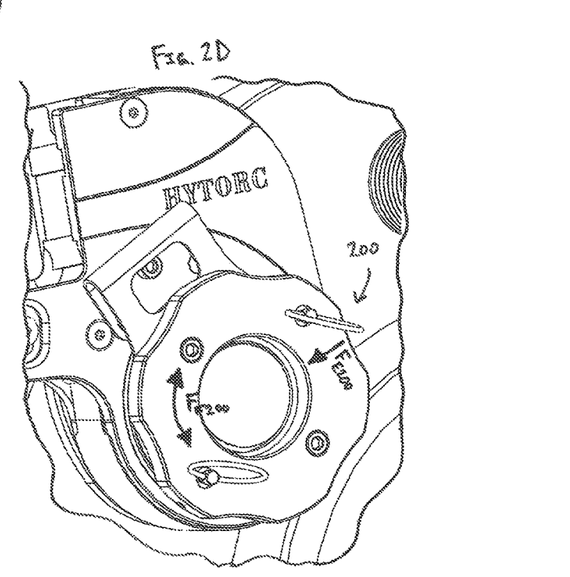

Operation of holding plate assembly 200 is as follows. In an optional step, the operator places a HYTORC® Z® Washer 23 on bolting application 40. The operator places nut 22 on threaded stud 21 and hand tightens nut 22 to bolting application 40. Tool 10 engages with nut 22, as shown in FIG. 2A. The operator assembles holding plate assembly 200 as previously described. The operator attaches tool housing connection portion 204A of retaining bracket 204 to link drive housing 13. Internal threads 201C of threaded plate assembly 201 engage exposed stud threads 21A of stud 21 above upper nut face 22C. Note that end portions 202C of dowel pins 202A do not protrude from bottom face 201B of threaded plate assembly 201 at this point. The operator hand tightens holding plate assembly 200 around exposed threads 21A such that lower projection face 201K rests adjacent upper nut face 22C and/or upper socket face 16C. The operator pushes pins 202A down to rotatably couple holding plate 201 and hex socket 16 and nut 22, if socket 16 is thicker than nut 22, as shown in FIGS. 2A-2D. Otherwise pins 202A just engage nut 22 if it is thicker than socket 16. These steps are represented by FIG. 2D. Then the operator tightens nut 22. Simply reverse these steps to loosen nut 22.

Tool 10 is securely supported to fastener 20. While tool 10 is tightening or loosening nut 22, the combination of holding plate 201 and retaining knob assembly 203 turns with and at the same speed as hex socket 16 and nut 22. Retaining dowel pin assembly 202 with biasing springs 201H apply a substantially consistent engagement force $F_{E200}$ acting in a parallel direction to turning force axis B and/or the substantially consistent friction force $F_{F200}$ acting in a normal direction to turning force axis B. As $F_{E200}$ remains substantially constant, holding plate assembly 200 will not lose its holding contact as exposed threads 21A increase (rise). While tool 10 is loosening nut 22, the combination of holding plate 201 and retaining knob assembly 203 turns with and at the same speed as hex socket 16 and nut 22. Retaining dowel pin assembly 202 with biasing springs 201H apply a substantially consistent engagement force $F_{E200}$ acting in a parallel direction to turning force axis B and/or the substantially consistent engagement force $F_{F200}$ acting in a normal direction to turning force axis B. As $F_{E200}$ remains substantially constant holding plate assembly 200 will not lose its holding contact as exposed threads 21A decrease (fall). Furthermore when loosening, holding plate assembly 200 will not be tightened against nut 22 while it rises toward the holder. Note that holding force $F_{E200}$ is substantially equivalent to the force generated when the operator hand tightens the combination of threaded plate assembly 201 and retaining knob assembly 203 onto stud 21.

Figure 3A:
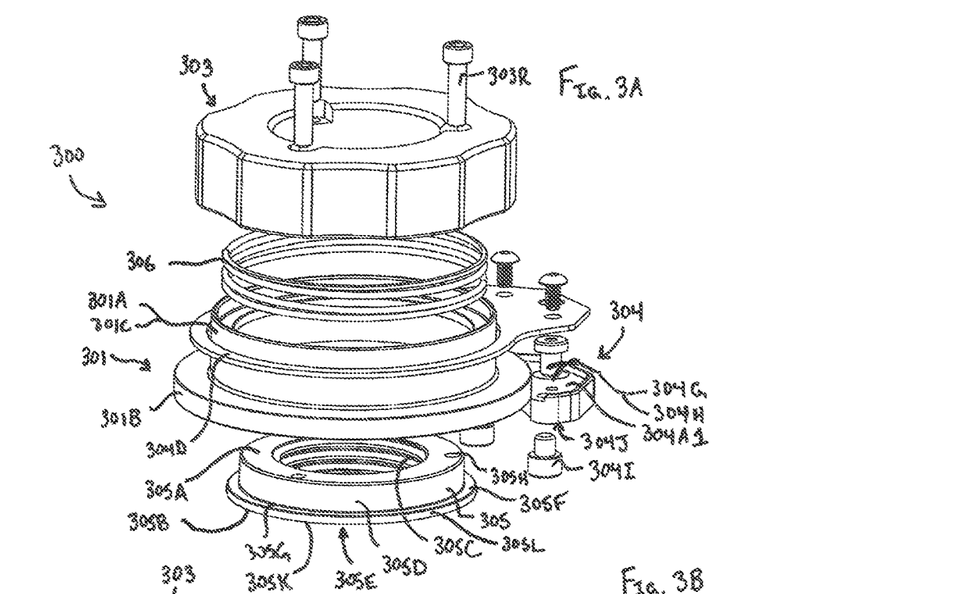
FIGS. 3A, 3B and 3C show various views of a third exemplary embodiment of the present invention.
Figure 3B:
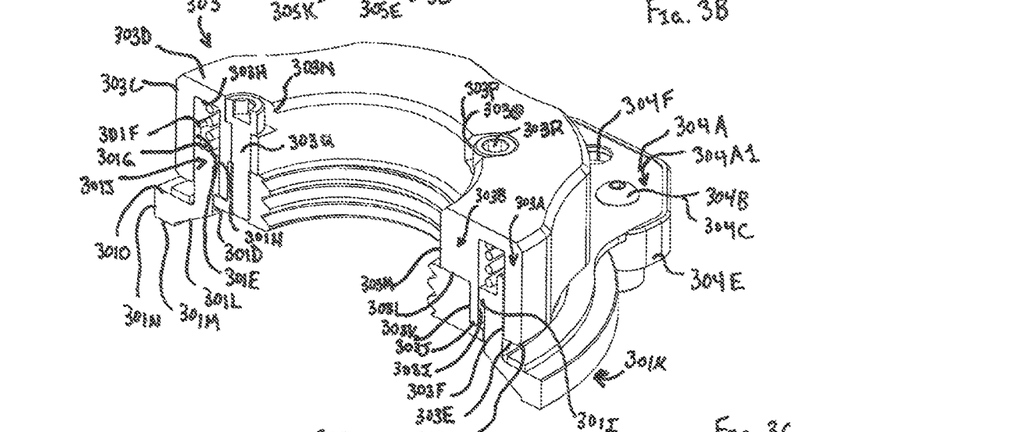
Figure 3C:
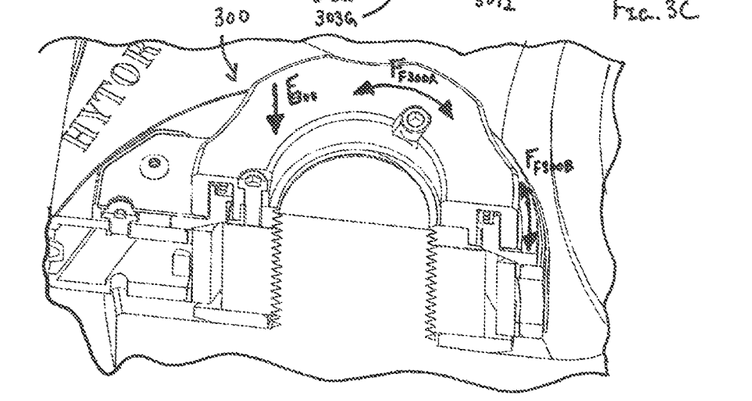

Another exemplary embodiment of the present invention, a holding plate assembly 300, is shown in FIGS. 3A, 3B and 3C. Holding plate assembly 300, as shown, allows limited (low) clearance hydraulic torque tools with through sockets like the HYTORC® STEALTH® 10 to be used in vertical and/or inverted bolting applications. Note that components of tool 10, threaded fastener 20, HYTORC® Z® reaction plate assembly 30, bolting application 40 and turning and reaction forces 90 and 92 of FIGS. 1A-1E correspond to similar structures of FIGS. 3A-3C.

Holding plate assembly 300 includes: a holding plate 301; a retaining knob assembly 303; a retaining bracket assembly 304; a threaded segment 305; and a retaining bias spring 306. Holding plate assembly 300 utilizes exposed threads 21A above nut 22 to support limited clearance tool 10 onto bolting application 40. Holding plate 301 has an annular shape similar in diameter as hex socket 16 and includes an upper portion 301A and a lower portion 301B. Upper portion 301A is shaped as a hollow cylinder having: an outer wall 301C; a first inner wall portion 301D; a second inner wall portion 301E; an upper wall 301F; and a ledge 301J. Ledge 301J includes: a top surface 301G; a side surface 301H; and a lower surface 301I. The length of first inner wall portion 301D is greater than the length of second inner wall portion 301E, and the length of second inner wall portion 301E is greater than side surface 301H of ledge 301J. The width of ledge 301J is greater than the width of first inner wall portion 301D, and the width of first inner wall portion 301D is greater than the width of second inner wall portion 301E. Lower portion 301B includes an annular projection 301K which extends outwardly from upper portion 301A. Annular projection, or ledge, 301K includes: an inner face 301L which extends downwardly and outwardly at an angle; a bottom face 301M; an outer face 301N; and an upper face 301O.

Retaining knob assembly 303 has a dual walled hollow annular shape made to receive a majority of holding plate 301. Retaining knob 303 assembly includes an outer portion 303A and an inner portion 303B separated by an upper inner wall 303H. Outer portion 303A includes: an outer wall 303C; an upper wall 303D; a lower wall 303E separated from outer wall 303C by a chamfered edge 303G; and an inner wall 303F. Inner portion 303B includes: outer wall 303I; first lower wall 303J; a first inner wall 303K; a second lower wall 303L; a second inner wall 303M; and an inner chamfered edge 303N. One or more tapped holes 303O are formed through inner portion 303B from upper wall 303D to second lower wall 303L. Tapped holes 303O include an upper portion 303P to receive heads of and a lower portion 303Q to receive unthreaded mid-shanks of one or more socket head cap screws 303R.

Retaining bracket assembly 304 has a ring portion 304D which surrounds a lower portion of outer wall 301C and rests on upper face 301O. Ring portion 304D is formed between annular projection 301K of holding plate 301 and lower wall 303E of retaining knob assembly 303 once assembled. Retaining bracket assembly 304 is not rotatably coupled with holding plate 301 or retaining knob assembly 303. A tool housing connection portion 304A includes one or more screws 304B formed through one or more holes 304C. A retaining spacer block 304E includes one or more threaded holes 304F to receive threaded portions of screws 304B. Tool housing connection portion 304A rests in a receiving void 304A1 and is connected to retaining spacer block 304E by screws 304B. Retaining spacer block 304E is connected to link drive housing portions 13A and 13B by one or more screws 304G formed through one or more holes 304G. And retaining spacer block 304E is stabilized against link drive housing portions 13A and/or 13B by one or more stabilizing screws 304I formed through one or more holes 304J of link drive housing 13. Retaining bracket assembly 304 is attached to and rotatably coupled to link drive housing 13.

Threaded segment 305 has an annular shape with similar inner diameter as stud 21 and similar outer diameter as nut 22 and includes: a top face 305A; a bottom face 305B; and inner threaded wall 201C; and an outer wall 305D. Threaded inner wall 305C which surrounds an inner void 305E is threadedly engageable with exposed threads 21A. An annular projection 305F extends outwardly from bottom face 305B and a lower portion of outer wall 305D. It has: an upper projection face 305G; a lower projection face 305K; and an outer projection face 305L formed there between. Threaded segment 305 further includes one or more threaded holes 305H to receive threaded end-shanks of one or more socket head cap screws 303R.

Retaining bias spring 306 is formed between upper inner wall 303H of retaining knob assembly 303 and second inner wall portion 301E and top surface 301G of holding plate 301. Retaining bias spring 306 minimizes a gap which may form between holding plate 301 and retaining knob 303 as threaded segment 305 threads down stud 21.

Assembly of holding plate assembly 300 is as follows. The operator provides holding plate 301. The operator places ring portion 304D of retaining bracket assembly 304 over annular projection 301K. Retaining bias spring 306 is placed on ledge 301J. Retaining knob assembly 303 is placed over retaining bias spring 306 and ring portion 304D such that: inner wall 303F is adjacent outer wall 301C; and outer wall 303I is adjacent side surface 301H. Threaded segment assembly 305 is inserted within holding plate 301 such that: top face 305A is adjacent second lower wall 303L; outer wall 305D is adjacent first inner wall 303K; outer projection face 305L is adjacent first inner wall portion 301D; and upper projection face 305G is adjacent first lower wall 303J. Cap screws 303R connect and rotatably couple retaining knob assembly 303 and threaded segment 305 such that retaining bias spring 306 is pressurized between top surface 301G and upper inner wall 303H. Note that the combination of retaining knob assembly 303 and threaded segment 305 are free to rotate relative to holding plate 301. And tool housing connection portion 304A is attached to retaining spacer block 304E which is then connected to link drive housing 13. The operator hand tightens holding plate assembly 300 around exposed threads 21A such that bottom face 305B rests on upper nut face 22C and/or upper socket face 16C, and projection face 301M rests on tool housing upper portion 13C. This generates an engagement force $F_{E300}$ on nut 22. A first friction force $F_{F300B}$ is generated between bottom face 305B rests and upper nut face 22C and/or upper socket face 16C. And a second friction force $F_{F300B}$ is generated between projection face 301M, retaining bias spring 306 and upper nut face 22C and/or upper socket face 16C.

Once hand tightened around exposed threads 21A, the combination of retaining knob assembly 303 and threaded segment 305, rotatably coupled via cap screws 303R, to turn together with and at the same rate as hex socket 16 and thus nut 22. Note that retaining bias spring 306 pressurizes holding plate 301 and the combination of retaining knob assembly 303 and threaded segment 305. Retaining bias spring 306 minimizes a gap which may form between holding plate 301 and retaining knob assembly 303 as threaded segment 305 threads down stud 21. This rotational coupling maintains substantially consistent engagement force $F_{E300}$ on nut 22 and/or socket 16 throughout a tightening or loosening process. Absent retaining bias spring 306, or a similar coupling/friction feature, holding plate 301 may not rotate with nut 22. Indeed as tool 10 tightens nut 22 a gap may form and widen between bottom face 305B and upper nut face 22C and/or upper socket face 16C. During loosening, retaining bias spring 306 helps prevent holding plate assembly 300 from locking up against tool 10 and/or nut 22.

Operation of holding plate assembly 300 is as follows. In an optional step, the operator places a HYTORC® Z® Washer 23 on bolting application 40. The operator places nut 22 on threaded stud 21 and hand tightens nut 22 to bolting application 40. Tool 10 engages with nut 22, as shown in FIG. 3C. The operator assembles holding plate assembly 300 and attaches it to link drive housing 13 as previously described. Internal threads 305C of threaded segment 305 engage exposed stud threads 21A of stud 21 above upper nut face 22C. The operator hand tightens holding plate assembly 300 around exposed threads 21A such that bottom face 305B rests on upper nut face 22C and/or upper socket face 16C, and projection face 301M rests on tool housing upper portion 13C. Then the operator tightens nut 22. Simply reverse these steps to loosen nut 22.

Tool 10 is securely supported to fastener 20. While tool 10 is tightening or loosening nut 22, the combination of retaining knob assembly 303 and threaded segment 305 turns with and at the same speed as hex socket 16 and nut 22. Retaining bias spring 306 applies a substantially consistent engagement force $F_{E300}$ acting in a parallel direction to turning force axis B, and/or the substantially consistent friction force $F_{F300}$ acting in a normal direction to turning force axis B. As $F_{E300}$ remains substantially constant holding plate 301 will not lose its holding contact on link drive housing 13C as exposed threads 21A increase (rise). While tool 10 is loosening nut 22, the combination of retaining knob assembly 303 and threaded segment 305 turns with and at the same speed as hex socket 16 and nut 22, and retaining bias spring 306 applies a substantially consistent engagement force $F_{E300}$ acting in a parallel direction to turning force axis B. As $F_{E300}$ remains substantially constant holding plate 301 will not lose its holding contact on link drive housing 13C as exposed threads 21A decrease (fall). Furthermore when loosening, holding plate assembly 300 will not be tightened against nut 22 while nut 22 rises toward the holder. Note that holding force $F_{E300}$ at the beginning of a tightening or loosening step is substantially equivalent to the force generated on link drive housing 13 when the operator hand tightens the combination of retaining knob assembly 303 and threaded segment 305 onto stud 21.

Figure 4A:
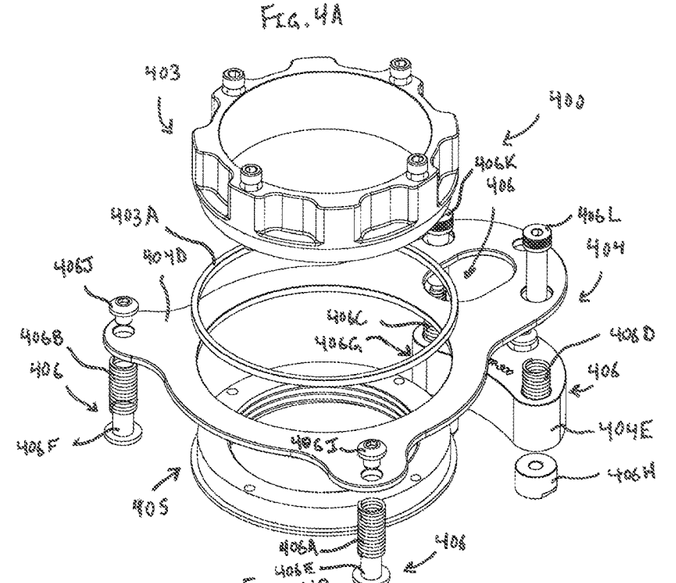
FIGS. 4A, 4B and 4C show various views of a fourth exemplary embodiment of the present invention.
Figure 4B:
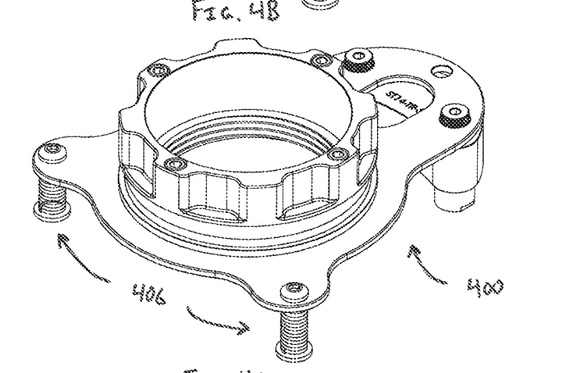
Figure 4C:
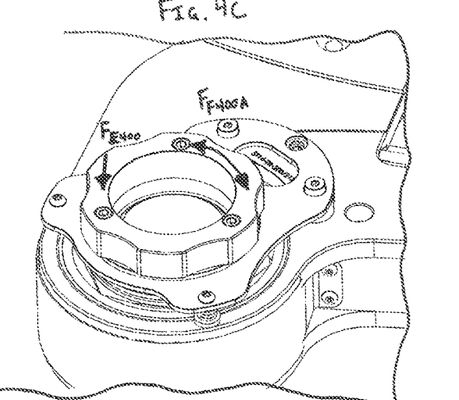

Another exemplary embodiment of the present invention, a holding plate assembly 400, is shown in FIGS. 4A, 4B and 4C. Holding plate assembly 400, as shown, allows limited (low) clearance hydraulic torque tools with through sockets like the HYTORC® STEALTH® 10 to be used in vertical and/or inverted bolting applications. Note that components of tool 10, threaded fastener 20, bolting application 40 and turning and reaction forces 90 and 92 of FIGS. 1A-1E correspond to similar structures of FIGS. 4A-4C. Note that HYTORC® Z® reaction plate assembly 30 is not shown in FIGS. 4A-4C.

Holding plate assembly 400 includes: a retaining knob assembly 403; a retaining bracket assembly 404; a threaded segment 405; and a retaining bias spring and binding post assembly 406. Holding plate assembly 400 utilizes exposed threads 21A above nut 22 to support limited clearance tool 10 onto bolting application 40.

Several components of holding plate assembly 400, including retaining knob assembly 403, retaining bracket assembly 404 and threaded segment 405, have corresponding similar structures with that of holding plate assembly 300, including retaining knob assembly 303, retaining bracket assembly 304 and threaded segment 305. Note that subtle design differences between these corresponding components have little effect on operation of holding plate assembly 400 compared to holding plate assembly 300. Some components of holding plate assembly 400, including retaining bias spring and binding post assembly 406, however, substantially differ from corresponding structures of holding plate assembly 300, including holding plate 301 and retaining bias spring 306. Retaining bias spring and binding post assembly 406 includes a plurality of: bias springs 406A-D; binding posts and pins 406E-H; and binding cap screws 406I-406L.

Note that regular and/or compression washers may be used between a ring portion 404D of retaining bracket assembly 404 and binding cap screws 406I-406J. Note that a ring bearing 403A, as shown in FIGS. 4A-4C, may be used between retaining knob assembly 403 and ring portion 404D. Note that a ring bearing, not shown, may be used between ring portion 404D and threaded segment 405. These ring bearings may be made from any suitable material such as, for example, Teflon.

In this example, bias springs 406A-D are substantially equally compressed and apply substantially consistent engagement force $F_{E400}$ acting in a parallel direction to and about turning force axis B. As $F_{E400}$ remains substantially constant binding posts and pins 406E-H maintains its holding contact on link drive housing 13C as exposed threads 21A decrease (fall) during operation. Binding cap screws 406I-406L can be adjusted to increase or decrease the compression of bias springs 406A-D.

Generally, assembly of holding plate assembly 400 is as follows. The operator provides threaded segment assembly 405. The operator places ring portion 404D over threaded segment 405.

Retaining knob assembly 403 is placed over ring portion 404D. Cap screws connect and rotatably couple retaining knob assembly 403 and threaded segment 405. Note that the combination of retaining knob assembly 403 and threaded segment 405 are free to rotate relative to ring portion 404D. Retaining bias spring and binding post assembly 406 is attached to ring portion 404D and retaining spacer block 404E. Holding plate assembly 400 is then attached to link drive housing 13C via retaining spacer block 404E. At this point, binding posts and pins 406E-H press against link drive housing 13C because bias springs 406A-D are pressurized.

The operator then hand tightens holding plate assembly 400 around exposed threads 21A. This generates an engagement force $F_{E400}$ on nut 22. A friction force $F_{F400A}$ is generated between a bottom face of threaded segment 405 and upper nut face 22C and/or upper socket face 16C.

Once hand tightened around exposed threads 21A, the combination of retaining knob assembly 403 and threaded segment 405 turns together with and at the same rate as hex socket 16 and thus nut 22. Note that retaining bias spring assembly 406 pressurizes the combination of retaining knob assembly 403 and threaded segment 405 onto nut 22. Bias springs 406A-406D minimize a gap which may form between threaded segment 405 and nut 22 as threaded segment 405 threads down stud 21. This rotational coupling maintains substantially consistent engagement force $F_{E400}$ on nut 22 and/or socket 16 throughout a tightening or loosening process. Absent bias springs 406A-406D, or a similar coupling/friction feature, threaded segment 405 may not rotate with nut 22. Indeed as tool 10 tightens nut 22 a gap may form and widen between threaded segment 405 and upper nut face 22C and/or upper socket face 16C.

During loosening, retaining bias springs 406A-406D helps prevent holding plate assembly 400 from locking up against tool 10 and/or nut 22.

Note that operation of holding plate assembly 400 is similar to that of holding plate assembly 400. In an optional step, the operator places a HYTORC® Z® Washer 23 on bolting application 40. The operator places nut 22 on threaded stud 21 and hand tightens nut 22 to bolting application 40. Tool 10 engages with nut 22, as shown in FIG. 4C. The operator assembles holding plate assembly 400 and attaches it to link drive housing 13 as previously described. Internal threads of threaded segment 405 engage exposed stud threads 21A of stud 21 above upper nut face 22C. The operator hand tightens holding plate assembly 400 around exposed threads 21A such that a bottom face of threaded segment 405 rests on upper nut face 22C and/or upper socket face 16C, and binding posts and pins 406E-H press against link drive housing 13C because bias springs 406A-D are pressurized. Then the operator tightens nut 22. Simply reverse these steps to loosen nut 22.

Tool 10 is securely supported to fastener 20. Generally, while tool 10 is tightening or loosening nut 22, the combination of retaining knob assembly 403 and threaded segment 405 turns with and at the same speed as hex socket 16 and nut 22. While tool 10 is tightening nut 22, bias springs 406A-D apply a substantially consistent engagement force $F_{E400}$ acting in a parallel direction to turning force axis B, and/or the substantially consistent friction force $F_{F400A}$ acting in a normal direction to turning force axis B. As $F_{E400}$ remains substantially constant threaded segment 405 will not lose its holding contact on upper nut face 22C and/or upper socket face 16C as exposed threads 21A increase (rise). Likewise, while tool 10 is loosening nut 22, bias springs 406A-D apply a substantially consistent engagement force $F_{E400}$ acting in a parallel direction to turning force axis B. As $F_{E400}$ remains substantially constant threaded segment 405 will not lose its holding contact on link drive housing 13C as exposed threads 21A decrease (fall). Furthermore when loosening, holding plate assembly 400 will not be tightened against nut 22 while nut 22 rises toward the holder. Note that holding force $F_{E400}$ at the beginning of a tightening or loosening step is substantially equivalent to the force generated on link drive housing 13 when the operator hand tightens the combination of retaining knob assembly 403 and threaded segment 405 onto stud 21.

In another embodiment of the present invention, holding plate assemblies include magnets on the nut engagement side for additional connectivity of the holding plates and/or threaded assemblies and nut 36. Alternatively such magnets may replace dowel pins.

Nut 36 and socket 16, as shown, are hex shaped, but any suitable geometry which rotatably couples the nut and socket may be used.

Note that threaded fastener 20 could include a second nut on the opposite side of a bolting application 40. Stud 21 alternatively could be a bolt with a bolt head in which case the second nut would be unnecessary. Note that a threaded fastener of the present invention alternatively may include a threaded bolt with a bolt head in which case nut 22 would be unnecessary.

Additional frictional elements may be incorporated into various components to increase surface contact. Dowel pin end portions 102C and/or 202C, projection faces 101G and/or lower projection face 201K, for example, may include roughenings or serrations to increase friction with nut 22, socket 16 and/or the tool's ratchet.

Note that while the HYTORC® STEALTH® 10 is shown with holding plate assemblies of the present invention, any limited clearance torque tool having through sockets may be used. Note that a push release spring loaded catch mechanism may be formed between and attach to a holding plate and a support bracket.

Note that dimension tolerances need not be overly accurate such that one holding plate assembly may be used with two or more imperial and two or more metric sizes. Note that holding plate assemblies of the present invention only support weight and carries no torque load such that materials need not be overly robust.

A system for use in operations of tightening and/or loosening threaded fasteners of the kind having a nut and stud about an axis includes: an apparatus having a threaded assembly threadedly engageable with exposed threads of the stud above the nut and either a nut, a tool socket and/or a tool housing engagement assembly; a torque tool having a pass-through socket; and the fastener. Advantageously holding plate assemblies of the present invention: allow torque tools and/or drive extension links with through sockets to be used in vertical, inverted and/or tight clearance bolting applications; allow for simultaneous operation of multiple such tools on such bolting applications to achieve Parallel Joint Closure™; account for bolting application having long and/or protruding studs; and increase bolting speed and safety, efficiency, reliability and repeatability.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied in a fluid operated tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "comprising", "including", "having" and variations thereof mean that the specified features, steps or integers are included. The terms are not to be interpreted to exclude the presence of other features, steps or components.

What is claimed is:

1. An apparatus for use in operations of tightening and/or loosening threaded fasteners of the kind having a nut and stud about an axis, the apparatus including:
   a threaded assembly threadedly engageable with exposed threads of the stud above the nut, the threaded assembly comprising a holding plate having a threaded inner wall and a projection surface resting on an upper nut surface; and
   a nut, a tool socket and/or a tool housing engagement assembly.

2. An apparatus according to claim 1 including the engagement assembly comprising a retaining dowel pin assembly.

3. An apparatus according to claim 2 wherein the dowel pin assembly rotatably couples the holding plate with at least the nut.

4. An apparatus according to claim 2 wherein the dowel pin assembly rotatably couples the holding plate with at least the socket.

5. An apparatus according to claim 2 wherein the dowel pin assembly rotatably couples the holding plate with the nut and the socket.

6. An apparatus according to claim 1 including:
   the threaded assembly comprises a threaded plate assembly;
   the engagement assembly comprises a retaining dowel pin assembly;
   a retaining knob assembly; and
   a retaining bracket assembly.

7. An apparatus according to claim 6 wherein the retaining dowel pin assembly and a biasing spring of the threaded plate assembly allow the combination of the threaded plate assembly and the retaining knob assembly, rotatably coupled via a cap screw of the retaining knob assembly, to turn together with at least the nut.

8. An apparatus according to claim 1 including:
   the threaded assembly comprising a threaded segment;
   the engagement assembly comprising a retaining bias spring assembly;
   a retaining knob assembly; and
   a retaining bracket assembly.

9. An apparatus according to claim 8 wherein the retaining bias spring assembly allows the combination of the threaded segment and the retaining knob assembly, rotatably coupled via a cap screw of the retaining knob assembly, to turn together with at least the nut.

10. An apparatus according to claim 1 including:
    the threaded assembly comprising a threaded segment;
    the engagement assembly comprising a retaining bias spring and binding post assembly;
    a retaining knob assembly; and
    a retaining bracket assembly.

11. An apparatus according to claim 10 wherein the retaining bias spring and binding post assembly allows the combination of the threaded segment and the retaining knob assembly, rotatably coupled via a cap screw of the retaining knob assembly, to turn with at least the nut.

12. An apparatus according to any preceding claim including magnets.

13. A torque tool having a pass-through socket for use in operations of tightening and/or loosening threaded fasteners of the kind having a nut and stud about an axis, the torque tool including an apparatus according to claim 1, 2, 3 or 12.

14. A system for use in operations of tightening and/or loosening threaded fasteners of the kind having a nut and stud about an axis, the system including a tool according to claim 13 and the fastener.

* * * * *